United States Patent [19]

Deuring

[11] Patent Number: 4,928,980

[45] Date of Patent: May 29, 1990

[54] SEALING COVER, PARTICULARLY FOR MOTOR VEHICLE CRANKCASES AND GEAR BOXES

[76] Inventor: Hans Deuring, Im Eulenflug 29, D-5093 Burscheid, Fed. Rep. of Germany

[21] Appl. No.: 333,694

[22] Filed: Apr. 5, 1989

Related U.S. Application Data

[63] Continuation of Ser. No. 103,750, Oct. 2, 1987, abandoned.

[30] Foreign Application Priority Data

Oct. 11, 1986 [DE] Fed. Rep. of Germany ....... 3634735

[51] Int. Cl.[5] .......................... F16J 15/10; F16J 15/32

[52] U.S. Cl. ................................ 277/153; 123/198 E; 277/181; 277/182; 277/214; 277/237 A; 277/DIG. 4

[58] Field of Search .......................................... 277/181

[56] References Cited

U.S. PATENT DOCUMENTS

| | | | |
|---|---|---|---|
| 2,487,669 | 11/1949 | Pattullo et al. | 277/227 X |
| 3,053,542 | 9/1962 | Haas . | |
| 3,363,952 | 1/1968 | Paterson | 277/153 X |
| 3,913,924 | 10/1975 | Barefoot et al. | 277/37 |
| 4,208,057 | 6/1980 | Messenger | 277/37 |
| 4,252,329 | 2/1981 | Messenger | 277/37 |
| 4,278,261 | 7/1981 | Miura et al. | 277/153 |
| 4,326,723 | 4/1982 | Arai | 277/153 |
| 4,336,945 | 6/1982 | Christiansen | 277/153 |
| 4,484,751 | 11/1984 | Deuring | 277/153 X |

FOREIGN PATENT DOCUMENTS

| | | | |
|---|---|---|---|
| 0720953 | 5/1942 | Fed. Rep. of Germany . | |
| 6160 | 1/1982 | Japan | 277/152 |

*Primary Examiner*—Allan N. Shoap

[57] ABSTRACT

A sealing cover for a housing is provided with a hole for passage of a shaft which extends through the cover. The cover comprises a metal cover body; a dynamically acting seal for the shaft, the dynamically acting seal comprising at least one elastic sealing lip which is vulcanized to the body; a statically acting seal for sealing the cover flange face, the statically acting seal comprising elastic sealing strips projecting axially with respect to the direction of the shaft which are vulcanized to the body. The improvement in the cover includes the body composed of a profiled, drawn sheet-metal body having an essentially cup-shaped cross section and the body has first, second and third faces which are offset from one another in the axial direction of the shaft and extend radially with respect to the axial direction, the third face includes a way for connecting the body to the housing, the second face is between the first and the third faces and receives the sealing strips, and the sealing lip is vulcanized to the first face.

20 Claims, 1 Drawing Sheet

FIG. 1
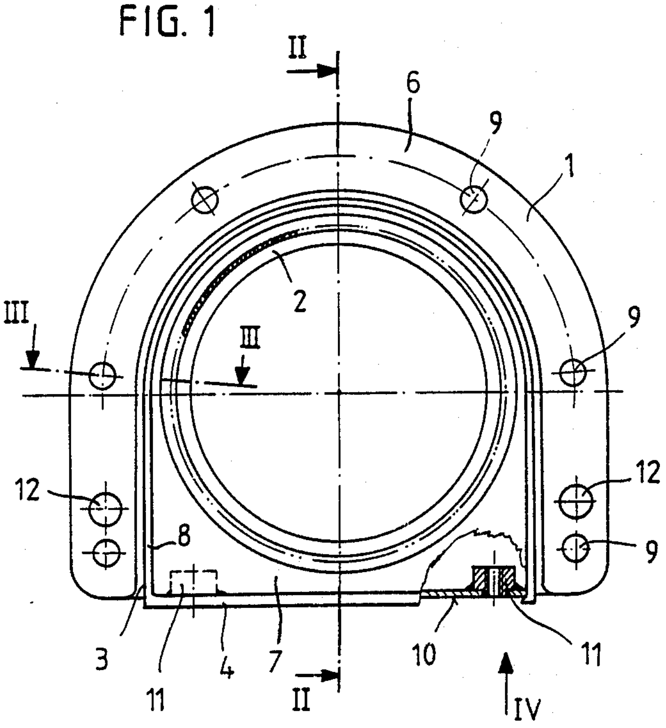
FIG. 2
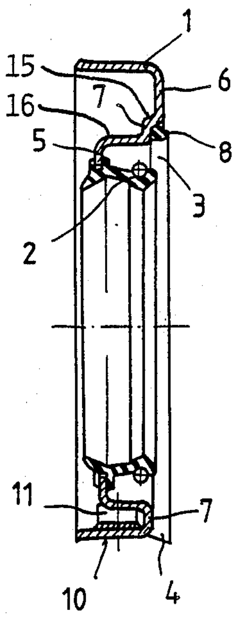
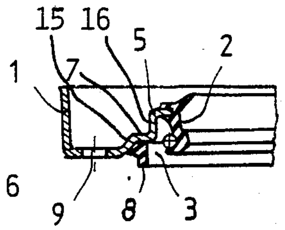
FIG. 3
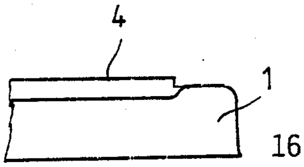
FIG. 4
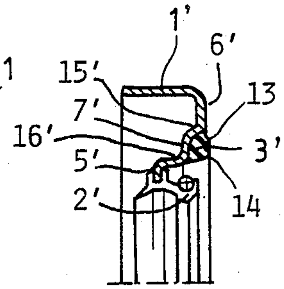
FIG. 5

SEALING COVER, PARTICULARLY FOR MOTOR VEHICLE CRANKCASES AND GEAR BOXES

This application is a continuation of application Ser. No. 103,750, filed Oct. 2, 1987, now abandoned.

BACKGROUND OF THE INVENTION

1. Field of the Invention

The present invention relates to a sealing cover for a housing in which a shaft extends through the cover, particularly for crankcases and gear boxes in motor vehicles. The sealing cover includes a dynamically acting seal for the shaft and a statically acting seal for the cover flange face. The dynamic seal is composed of at least one possibly spring charged elastic sealing lip vulcanized to the cover and the static seal is composed of axially projecting, elastic sealing strips which are vulcanized into recesses in the cover flange faces. The present invention also relates to a sealing cover as it is used in motor vehicle engines having crankcases which are equipped with a flanged-on oil pan, in which, in addition to the dynamic seal for the shaft, static seals are required for two flange faces which customarily abut on one another at an angle of 90°. One of these flange faces extends radially to the tight connection with the crankcase and the other flange face extends axially to the tight connection with the oil pan.

2. Discussion of the Prior Art

U.S. Pat. No. 4,484,751 discloses a sealing cover of the above-mentioned type. This sealing cover is composed of a die-cast aluminum body provided with an elastic sealing lip at its inner circumference for sealing the crankshaft passing through it. The radial flange face which is to be connected with the crankcase and the axial flange face which is to be connected with the oil pan are provided with sealing interfaces in the form of elastic sealing strips which are vulcanized into grooves in the flange faces. Additional, radially and axially extending grooves equipped with sealing strips produce a connection with the dynamically acting sealing lip, thus making vulcanization of the sealing elements particularly easy, especially in a transfer or compression molding process.

SUMMARY OF THE INVENTION

It is an object of the present invention to simplify the basic body of the sealing cover and, in particular, to minimize its processing costs.

The above and other objects are accomplished by the invention in which a sealing cover for a housing is provided with a hole for passage of a shaft which extends through the cover. The cover comprises a metal cover body; a dynamically acting seal for the shaft, the dynamically acting seal comprising at least one elastic sealing lip which is vulcanized to the body; a statically acting seal for sealing the cover flange face, the statically acting seal comprising elastic sealing strips projecting axially with respect to the direction of the shaft which are vulcanized to the body. The improvement in the cover includes the body composed of a profiled, drawn sheet-metal body having an essentially cup-shaped cross section and the body has first, second and third faces which are offset from one another in the axial direction of the shaft and extend radially with respect to the axial direction, the third face includes means for connecting the body to the housing, the second face is between the first and the third faces and receives the sealing strips, and the sealing lip is vulcanized to the first face.

According to the present invention, the sealing cover is composed of a profile-drawn sheet-metal body having an essentially cup-shaped cross section and three radial faces disposed in different axial planes. The bottom radial flange face of the sheet-metal cup serving as a connection with the housing to be sealed while the second radial face, which is axially offset in steps with respect to the first face, serves to accommodate the sealing strips. The third radial face also axially offset serves to bind the dynamic sealing lip. By configuring the sealing cover as a drawn sheet-metal element having three mutually offset radial faces, no further mechanical work is needed.

In contrast to the die-cast aluminum body employed in the past, it is no longer necessary to cut grooves to accommodate the sealing strips. The center radial face additionally shaped on during drawing of the sheet-metal cup serves to accommodate and fasten the sealing strips. Due to the step-shaped configuration of the bottom of the sheet-metal cup, the incompressible material of the sealing strip is also able to escape radially when installed.

According to a further feature of the invention, the cover is drawn from a sheet-metal body having an approximately cup-shaped cross section. In the region of the inner circumference of the radial flange face and in the region of the transition from the radial flange face to the axial flange face, the sheet-metal cup is given a stepped profile such that a set-back radial flange face is created to receive or, more precisely, bind the sealing strips in order to provide the static seal for both flange faces. This third, set-back radial flange face axially disposed between the other two radial faces permits in a simple manner the known binding of an uninterrupted sealing strip extending in both planes. This sealing strip has an angular configuration in the region where the radial and axial flange faces abut at 90°. Moreover, the stepped profile of the cross section of the sheet-metal body significantly contributes to a stiffer configuration. This means that the body can be manufactured of a relatively thin sheet metal and thus is of significantly lighter weight than the prior art die-cast aluminum body.

Within the scope of further features of the invention, it is proposed to provide sealing strips which are vulcanized on, essentially in the transition region of the rounded edges of the set-back face of the sheet-metal cup. The rounding of the edges resulting from drawing the sheet-metal body offers a relatively large base face for the binding of the sealing strips whose axially and radially projecting regions, respectively, should be relatively narrow and have a rectangular cross section to enhance their sealing function.

It is further proposed for the sealing strip which extends in a straight line parallel to the axial flange face to project from the radial and axial flange face, respectively at an acute angle.

It is also conceivable to provide the sealing strips with such a profile that a plurality of parallel sealing beads are produced.

BRIEF DESCRIPTION OF THE DRAWINGS

The invention may be better understood by referring to the detailed description of the invention when taken in conjunction with the accompanying drawings in which:

FIG. 1 is a front view of a sealing cover.

FIG. 2 is a sectional view along line II—II of FIG. 1.

FIG. 3 is a partial sectional view along line III—III of FIG. 1.

FIG. 4 is a partial side view seen in the direction IV of FIG. 1.

FIG. 5 is a partial sectional view of another embodiment of an annular sealing cover according to the invention.

DESCRIPTION OF THE PREFERRED EMBODIMENTS

The sealing cover shown in FIGS. 1 to 4 serves to seal the crankcase of a motor vehicle engine having an oil pan flanged on at the bottom of the engine. For better understanding, only the sealing cover in its configuration customary in the trade is shown.

The sealing cover is composed of a cup-shaped, drawn sheet-metal body 1 which, in order to seal the crankshaft (not shown) passing through it when installed, is provided with a dynamically charged, or loaded, sealing ring or lip 2 and statically acting sealing strips 3 and 4. Both the sealing ring 2 and sealing strips 3 and 4 are made of an elastomer material, with both sealing strips being made of one piece to change over from one to the other. Sheet-metal body 1 is provided with three radial flange faces 5, 6 and 7. Sealing ring 2 is vulcanized to flange face 5 while sealing rings 3 and 4 are vulcanized on in the region of flange face 7 which is axially offset with respect to flange face 6. Sealing rings 3 and 4 are connected with sheet-metal body 1 on a relatively broad based area in the rounded sheet-metal body region between radial faces 6 and 7 and extend axially in the form of a relatively narrow web 8 which projects from flange face 6. In the installed state, flange face 6 of sheet-metal body 1 is clamped to the crankcase (not shown) with the aid of screws placed through holes 9. This flange connection is sealed by means of sealing strip 3, particularly its axially projecting web 8. Along the inner circumference of cover flange face 6, one end of a first axially extending face 15 is connected. The other end of the first axially extending face 15 is connected to one end of the radially extending face 7. The other end of the radially extending face 7 is connected to one end of a second axially extending face 16 and the other end of the second axially extending face 16 is connected to the radially extending face 5.

To seal the-oil pan (not shown) which can be screwed to the crankcase from the bottom, sealing strip 4 is provided which—as can be seen in FIG. 2—projects from radial flange face 6 and also from bottom axial flange face 10 at an acute angle. Two nuts 11 are welded to the sealing cover to bolt the cover to the oil pan, see FIG. 1. Finally, bores 12 are provided to accommodate centering pins.

FIG. 5 shows a simplified, annular sealing cover which is made of a sheet-metal body 1'. Here sealing strip 3' is profiled in the region of its surface to have two concentric beads 13, 14 which extend in concentric rings with respect to one another. Body 1' includes three radial flange faces 5', 6' and 7' and two axial extending flange faces 15' and 16', the flange face 5' receiving the dynamic seal 2'.

The present disclosure relates to the subject matter disclosed in German P No. 36 34 735.3 of Oct. llth, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. In a sealing cover for a housing; provided with a hole having a center axis, for passage of a shaft which extends through the cover along this axis, the cover comprising a metal cover body having a substantially arcuate-shaped cover flange face which extends radially outward with respect to said axis, said cover flange face having an inner edge; a dynamically acting seal for the shaft, the dynamically acting seal comprising at least one elastic sealing lip which is vulcanized to the body; a statically acting seal means, including first and second elastic sealing strips projecting in an axial direction substantially parallel to said axis of said hole and vulcanized to said body, for sealing the cover flange face, the improvement wherein:

said body is composed of a profiled, drawn sheet-metal body including:

a first axially extending face having an axially outward end connected to the inner edge of said cover flange face;

a first radially inwardly extending face surrounding said hole and having an arcuate first face portion and a second face portion connecting opposite ends of said first face portion, said first portion having a radially outward end connected to an axially inward end of said first axially extending face, so that said first face portion of said first radially inwardly extending face is axially offset relative to said cover flange face;

a second axially extending face having an axially outward end connected to a radially inward end of said first face portion of said first radially extending face; and a second radially inwardly extending face having a radially outward end connected to an axially inward end of said second axially extending face so that said first face portion of said first radially inwardly extending face is disposed radially inward of said cover flange face and radially outward of said second radially inwardly extending face; and wherein said cover flange face includes means for connecting said body to the housing, said first face portion of said first radially extending face receives said first sealing strip and said second face portion of said first radially extending face receives said second sealing strip such that said first and second sealing strips are formed in one plane, and said sealing lip is vulcanized to a radially inward end of said second radially extending face.

2. In a sealing cover as defined in claim 1, wherein said cover flange face extends only partially about said hole and has opposite spaced-apart ends, and said first radially extending face is connected to said first axially extending face along rounded edges between said first axially extending face and said first radially extending face, wherein said first strip and said second strip are joined together in a closed loop, and wherein said first strip is vulcanized on said rounded edges and said second strip is vulcanized to a portion of said body extending between said opposite ends of said cover flange face.

3. In a sealing cover as defined in claim 2, wherein said first strip has an approximately rectangular cross-sectional profile which axially projects beyond said cover flange face.

4. In a sealing cover as defined in claim 2, wherein said second portion of said first radially inwardly extending face has opposite ends respectively adjacent to said opposite bottom ends of said cover flange face, said cover further comprising a bottom axial flange face extending between said opposite bottom ends of said cover flange face and having an axially outward edge connected to said radially outward edge of said first radially inwardly extending face, wherein said second strip extends in a straight line along said bottom axial flange face and projects from said bottom axial flange face at an angle to said bottom axial flange face.

5. A Sealing cover as in claim 4, wherein said first and second sealing strips are formed in a single plane.

6. In a sealing cover as defined in claim 2, wherein said first strip has a multiply profiled surface.

7. A sealing cover as defined in claim 1, wherein said cover flange face only partially surrounds said hole and has opposite spaced apart bottom ends, said first strip and said second strip being joined together in a closed loop, said second portion of said first radially inwardly extending face including a straight line portion having opposite ends respectively adjacent to said opposite bottom ends of said cover flange face, said second strip extending in a straight line along said straight line portion and projected angularly downward thereform.

8. A sealing cover for a housing, provided with a hole having a center axis for passage of a shaft which extends through the cover along this axis, the cover comprising:

a profiled, drawn sheet-metal cover body, including an arcuate cover flange face partially surrounding said hole and having opposite bottom ends and which extends radially outwardly with respect to said axis and has a radially inner edge, and a bottom axial flange face, extending between said opposite bottom ends in a plane which extends axially at an angle of approximately 90 degrees to said cover flange face;

an axially extending face having an axially outward end connected to the inner edge of said cover flange face, and a radially inwardly extending face axially spaced from said cover flange face, entirely surrounding said hole and including an arcuate first face portion and a second face portion, said second face portion having opposite ends respectively connected to said opposite bottom ends of said cover flange face and a radially outward edge connected to an axially outward edge of said bottom axial flange face, and said first face portion having opposite ends connected to the opposite ends of said second face portion and radially outward edges connected to an axially inward edge of said axially extending face;

a statically acting seal means, including first and second elastic sealing strips disposed in one plane and projecting in the axial direction of, and radially with respect to the axis of said hole and vulcanized to said body, for sealing the cover flange face and the bottom axial flange face, said first face portion receiving said first strip, said second strip extending along and projecting from said bottom axial flange face; and a dynamically acting seal for the shaft, the dynamically acting seal comprising at least one elastic sealing lip which is vulcanized to the body.

9. A sealing cover as defined in claim 11, wherein said first face portion of said radially inwardly extending face is connected to said axially extending flange face along first rounded edges between said first face portion and said radially extending face, and said second face portion of said radially inwardly extending face is connected to said bottom axial flange face alone second rounded edges therebetween, and wherein said first and second sealing strips are vulcanized on said rounded edges and said first and second strips are joined together at said opposite ends of said second face portion of said radially inwardly extending face to form a continuous loop.

10. A sealing cover as defined in claim 9, wherein said first strip has an approximately rectangular cross-sectional profile which axially projects beyond said cover flange face.

11. A Sealing cover as in claim 9, wherein said first and second sealing strips are formed in a single plane.

12. A sealing cover as defined in claim 9, wherein said second strip extends in a straight line along said bottom axial flange face and projects from said bottom axial flange face at an angle to said bottom axial flange face.

13. A Sealing cover as in claim 12, wherein said first and second sealing strips are formed in a single plane.

14. A sealing cover as defined in claim 9, wherein said first strip has a multiply profiled surface.

15. A sealing cover as defined in claim 9, wherein said first and second rounded edge are formed in a single plane and said first and second strips are formed in said plane.

16. A sealing cover as in claim 8, wherein said second strip projects from an edge of said bottom axial flange face where said bottom axial flange face is connected to said second portion of said radially inwardly extending face.

17. A Sealing cover as in claim 16, wherein said first and second sealing strips are formed in a single plane.

18. A Sealing cover as in claim 8, wherein said first and second sealing strips are formed in a single plane.

19. A sealing cover as in claim 8, wherein said radially inwardly extending face is formed in a single plane and said first and second strips are formed in said plane.

20. A sealing cover as in claim 19, wherein said second strip projects downward at an angle to said bottom axial flange face.

* * * * *